United States Patent [19]

Hirose et al.

[11] Patent Number: 4,768,998
[45] Date of Patent: Sep. 6, 1988

[54] BELT DRIVING APPARATUS FOR BICYCLE

[75] Inventors: Shinichiro Hirose, Toride; Kanzo Akamatsu, Kashiwa, both of Japan

[73] Assignee: Sakae Ringyo Co., Ltd., Tokyo, Japan

[21] Appl. No.: 49,820

[22] Filed: May 14, 1987

[30] Foreign Application Priority Data

Aug. 26, 1986 [JP] Japan .............................. 61-199384
Nov. 25, 1986 [JP] Japan .............................. 61-280145

[51] Int. Cl.⁴ .............................................. F16H 15/00
[52] U.S. Cl. ................................... 474/152; 74/594.2; 474/112
[58] Field of Search ............... 474/152, 153, 78, 80, 474/141, 112, 148; 74/594.1, 594.2, 594.3, 571 M

[56] References Cited

U.S. PATENT DOCUMENTS

| 631,208 | 8/1899 | Frazeur | 74/594.2 |
| 4,412,828 | 11/1983 | Darby | 474/78 X |
| 4,599,079 | 7/1986 | Chappell | 474/80 |

Primary Examiner—Thuy M. Bui
Attorney, Agent, or Firm—Lowe, Price, LeBlanc, Becker & Shur

[57] ABSTRACT

A belt driving apparatus for a bicycle is disclosed wherein a driving gear has an outer gear over which is trained a toothed belt to impart rotational force to the bicycle rear wheel. An inner gear disposed within the outer gear includes teeth along its outer periphery meshing with teeth formed on the inner periphery of a crank gear disposed between the inner and outer gears. The crank gear is mounted on a crank shaft.

2 Claims, 4 Drawing Sheets

BELT DRIVING APPARATUS FOR BICYCLE

BACKGROUND OF THE INVENTION

1. Technical Field of the Invention

This invention relates to a belt driven bicycle, and more particularly to an apparatus for driving such a belt.

2. Prior Art

FIG. 7 shows a conventional belt driving apparatus for a bicycle. More specifically, this belt driving apparatus comprises a driving pulley 2 of large diameter mounted on a crank shaft 1 and a driven pulley 3 of small diameter mounted on a shaft on the side of a rear wheel (not shown) with a toothed belt 4 being trained over the driving and driven pulleys 2, 3. In the belt driving apparatus fabricated as above-mentioned idlers 5a, 5a which are close to each other urge the toothed belt 4 such as to apply a certain tensile force thereto in order to prevent the toothed belt 4 from being removed or slipping. When toothed belt 4, if urged by the idlers 5a, 5a is rotated and driven while being in a curved condition in the position where the idler 5a is located, the belt 4 becomes greatly damaged. This requires the belt to be replaced after a short time.

FIG. 8 shows another conventional belt driving apparatus which comprises a driving gear 6 mounted on the crank shaft 1, a floating wheel 7 with internal teeth 7a which meshes with the driving gear 6, and a toothed belt 4 trained over the floating wheel 7 for rotatably driving the driven pulley 3. The belt driving apparatus arranged as aforementioned is required to secure the rotational speed of the driven pulley 3 by use of the driving gear 6 and a floating wheel 7, each of large diameter, since the floating wheel 7 is reducedly driven by the driving gear 6. The disadvantage derived from the use of the driving gear 6 and the floating wheel 7 of large diameter is that the weight of the bicycle is increased. In a belt driving apparatus of this type, the internal teeth 7a in a position adjacent a point A of the floating wheel 7 is disengaged from the teeth of the driving gear 6 or goes out of mesh therewith due to the inconsistent extent of eccentricity of the floating wheel 7 when the pedals are worked energetically. This may possibly cause damage to the teeth.

An alternative belt driving apparatus has been proposed wherein a driving gear of small diameter is disposed in a drum with internal teeth mounted on a crank shaft such that they mesh with each other, thereby obtaining a higher rotational speed. However, a large difference in diameter between the drum and the driving gear involves a disadvantage in that noise is readily produced when the internal teeth of the drum mesh with the driving gear.

OBJECT OF THE INVENTION

It is an object of the invention to provide a belt driving apparatus for a bicycle which is capable of driving a toothed belt and a gear without causing any damage thereto and of assuring the rotational speed thereof on the rear wheel side without producing any noise.

SUMMARY OF THE INVENTION

The invention includes an inner gear is provided within the interior of an outer gear over which a toothed belt is trained to form a driving gear. The inner gear is in mesh with a crank gear mounted on a crank shaft and provided on its inner periphery with teeth.

In an alternate embodiment, the invention includes an inner gear provided within the interior of an outer gear over which a toothed belt is trained to form a driving gear. The inner gear is in mesh with a crank gear which is mounted on a crank shaft and is provided on its inner periphery with teeth. A control plate is rotatably arranged between an inner wheel disposed coaxially of the crank gear and an outer wheel located coaxially of the driving gear and is eccentric relative to the inner wheel by a predetermined extent such as to control the eccentricity of the driving gear.

EMBODIMENT OF THE INVENTION

An embodiment of the invention will now be explained in detail with reference to the drawings.

Figure 1:
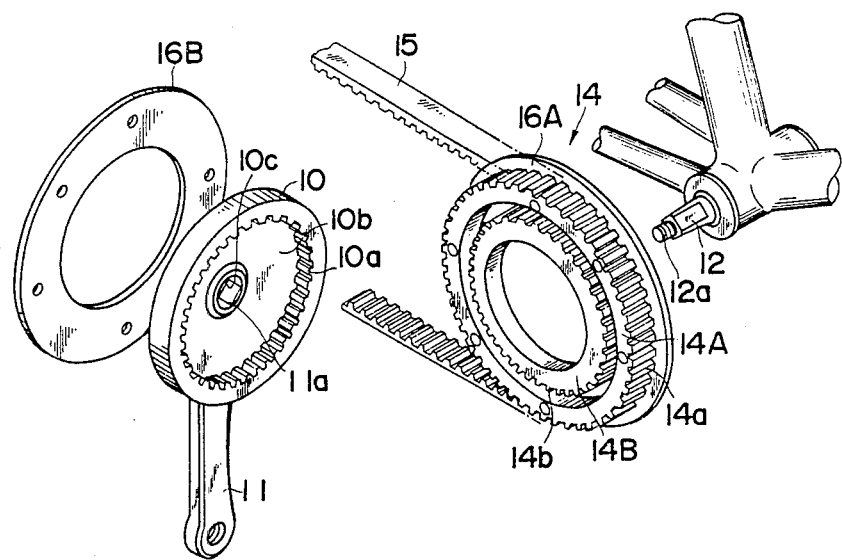
FIGS. 1 and 2 are an exploded perspective view and a front view of a belt driving apparatus according to the first embodiment.
Figure 2:
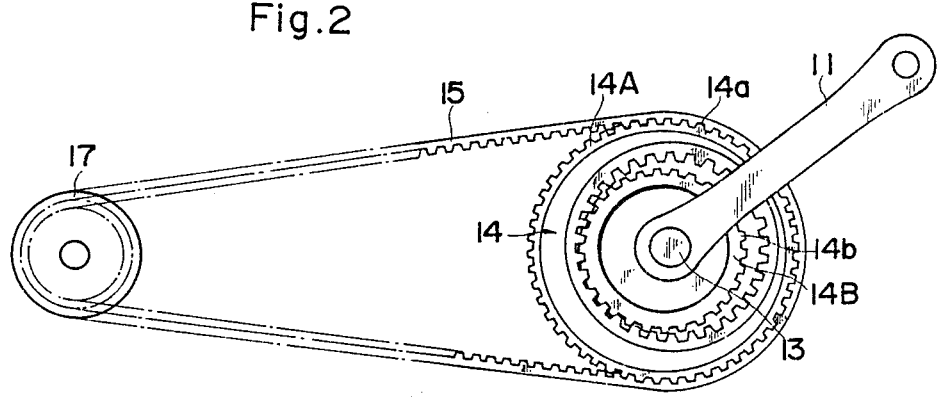

A belt driving apparatus for a bicycle according to the first embodiment includes a crank gear 10 as shown in FIGS. 1 and 2. The crank gear 10 is provided on its inner periphery with teeth 10a and includes a side wall 10b integrally formed therewith. The side wall 10b is formed at its center with a square opening 10c into which is inserted a square fitting means 11a extending from one end of the crank arm 11. The fitting means 11a is fitted over a square crank shaft 12, and a cap 13 is screwed around a thread 12a at the forward end of the crank shaft 12. A pedal (not shown) is fixed to the other end of the crank arm 11.

A driving gear 14 driven by the crank gear 10 includes an outer gear means 14A of large diameter. The outer gear means 14A is provided on its outer periphery with teeth 14a and carries a toothed belt 15 trained thereover. The outer gear means 14A has formed in its interior an inner gear means 14B coaxial therewith. The inner gear means 14B is formed such that its diameter is somewhat smaller than that of the crank gear 10 and is provided on its outer periphery with teeth 14b. A cover 16A is integrally formed with the outer and inner gear means 14A and 14B on one of the end faces thereof. Another cover 16B disposed between the crank arm 11 and the crank gear 10 is bolted to the outer gear means 14A at the other end thereof. The crank gear 10 is located between the outer and inner gear means 14A and 14B so that its teeth 10a mesh with the teeth 14b of the inner gear means 14B.

The toothed belt 15 is made of rubber containing Kevlar fiber and is trained over the outer gear means 14A and a driven pulley.

In the above belt driving apparatus, when the crank arm 11 is rotated by working the pedals to thereby rotate the crank gear 10 so that the driving ger 14 is made eccentric and moved by means of the inner gear means 14B in mesh with the crank gear for applying a predetermined tensile force to the toothed belt 15, the inner gear means 14B is then rotated by means of the crank gear 10 to thus rotatably drive the toothed belt by means of the outer gear means 14A.

In this manner, when tensile force is exerted on the toothed belt 15 by eccentric movement of the driving gear 14, the toothed belt may be rotatably driven without bending it and is not damaged even if it is used for a long period of time.

Further, the inner gear means 14B of somewhat smaller diameter is eccentric and rotated by means of the crank gear 10 to thereby increase the rotational speed of the outer gear means 14A. For this reason, the driven pulley 17 may be rotated at a predetermined speed to enable the driven pulley 17 to rotate at a predetermined speed without the outer diameter and dimension of the outer gear means 14 needing to be increased so much. This minimizes the weight of the driving gear as a whole such as to lighten the apparatus itself. The difference in outer diameter and dimension between the crank gear 10 and the inner gear means 14B are small so that generation of noise is avoided.

Figure 3:
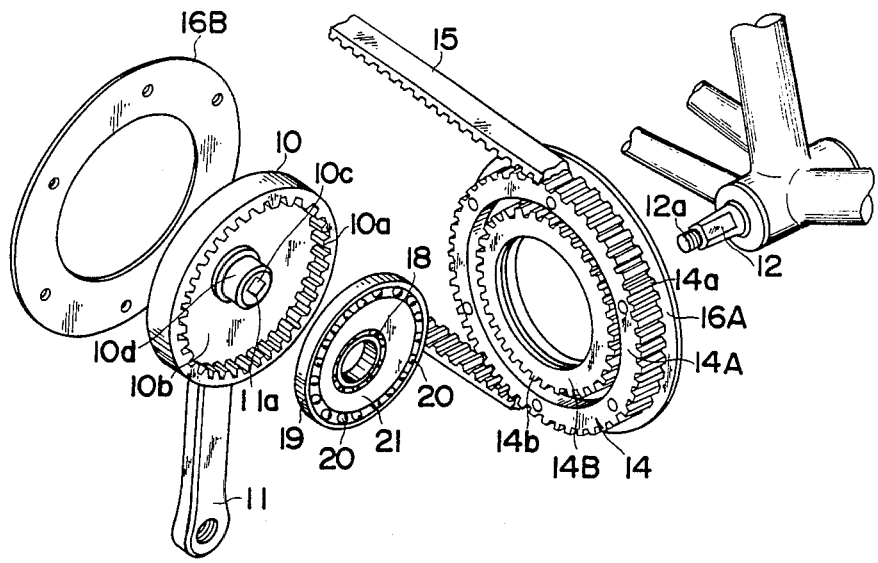
FIGS. 3 and 4 are an exploded perspective view and a front view of a belt driving apparatus according to the alternate embodiment.
Figure 4:
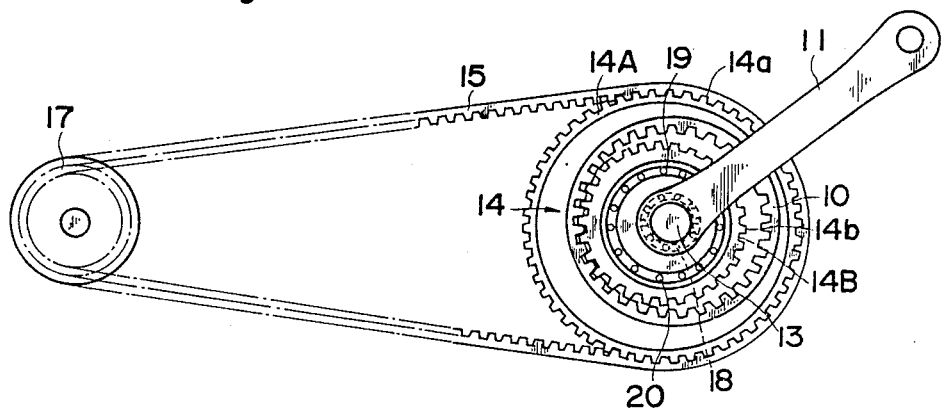

FIGS. 3 and 4 show another belt driving apparatus according to the second invention, which includes the crank gear 10. The crank gear 10 is provided on its inner periphery with teeth 10a and includes a side wall 10b formed integrally with the crank gear. A boss 10d extends from the center of the side wall 10b and is formed with a square opening 10 into which is inserted the fitting means 11a in a square form projecting from the crank arm 11 at one end thereof.

The fitting means 11a is in turn fitted over the square crank shaft 12. The cap 13 is screwed onto the thread 12 formed at the forward end of the crank shaft 12. The pedal (not shown) is attached to the other end of the crank arm 11.

The driving gear 14 driven by the crank gear 10 includes the outer gear means 14A of large diameter. The outer gear means 14A is formed on its outer periphery with the teeth 14a over which the toothed belt 15 is trained. The inner gear means 14B is disposed with in the interior of the outer gear means 14A to be coaxial therewith. The inner gear means 14B is provided with a diameter which is rather small and has the teeth 14b formed on its outer periphery. The cover 16 is formed integrally with the outer and inner gear means 14A and 14B at one end face thereof. The other cover member 16B which covers the crank gear 10 interiorly of the crank arm 11 is bolted to the outer gear means at the other end face thereof. The crank gear 10 is located between the outer and inner gear means 14A and 14B to allow its teeth 10a to mesh with the teeth 14b of the inner gear means 14B.

The inner wheel 18 of small diameter abuts against the boss 10d of the crank gear 10. On the other hand, the outer wheel 19 of large diameter is mounted within the inner periphery of the inner gear means 14B.

An eccentricity control plate 21 is rotatably located over a bearing 20 and between the inner and outer wheels 18 and 19. The control plate 21 is eccentric relative to the inner wheel 18 by a predetermined extent.

The toothed belt 15 is formed of a rubber member-containing Kevlar fiber and is trained over the outer gear means 14A and the driven pulley 17.

Now, operation of the belt driving apparatus according to the invention will be described.

Figure 5:
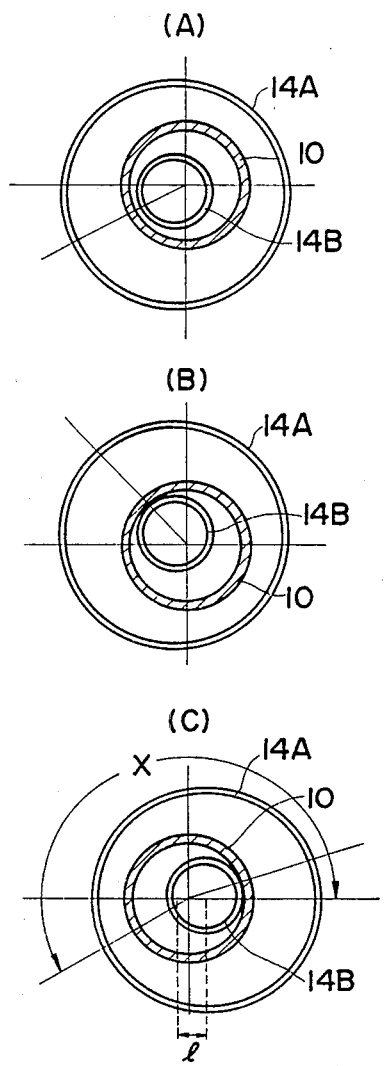
FIGS. 5A, 5B, and 5C and FIGS. 6A, 6B, and 6C are schematic views explanatory of the manner in which the apparatus shown in FIGS. 3 is operated in succession.
Figure 6:
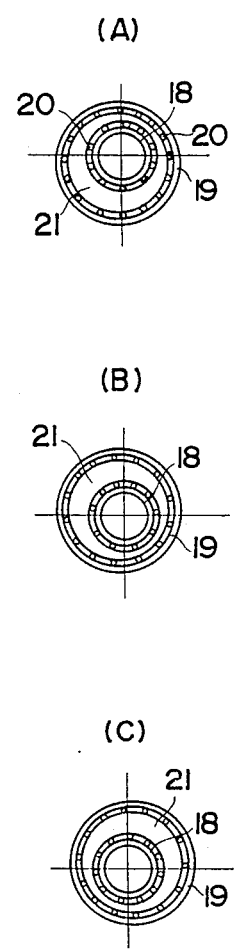
Figure 7:
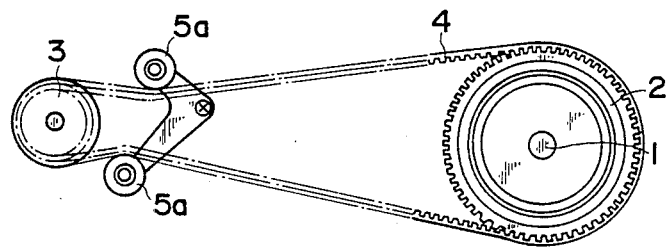
FIGS. 7 and 8 are front views of a conventional belt driving apparatus.
Figure 8:
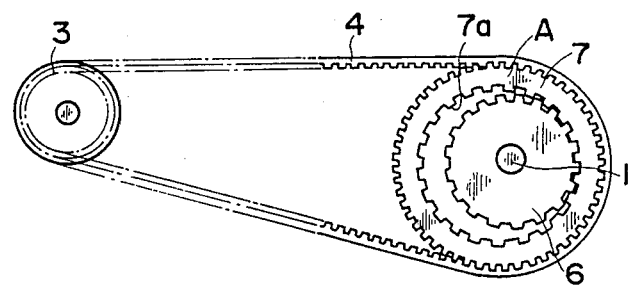

The toothed belt 15 as shown in FIG. 5(A), if it is of a sufficient length, renders the inner gear section 14B of the driving gear 14 eccentric in the leftward direction and downwardly relative to the crank gear 10, its teeth 14b thereby being meshed with the teeth 10a of the crank gear 10. In this condition, the control plate 21 is eccentric leftwardly and downwardly relative to the inner wheel 18 as shown in FIG. 6A.

Upon pedalling, rotation of the crank gear 10 occurs so that the inner gear means 14B meshes with the crank gear 10 and is thereby made eccentric leftwardly and upwardly relative to the crank gear 10, as shown in FIG. 5B. On the other hand, the control plate 21 is also eccentric leftwardly and upwardly relative to the inner wheel 8 (crank gear 10), as shown in FIG. 6B, since the outer wheel 19 as well as the inner gear means 14B is eccentric and rotated therewith.

When the pedals are fully worked and the bicycle is running, the inner gear means 14B, as shown in FIG. 5C, is eccentric to the right of the crank gear 10 and adjacent the center thereof and thereby moves the outer gear means 14A forwardly in the direction in which the latter is running, thereby applying tensile force to be toothed belt 15. Consequently, the inner gear means 14B is rotated by the rotation of the crank gear 10 so that the outer gear means 14A is caused to rotatably drive the toothed belt 15. The control plate 21, as shown in FIG. 6C, is in turn eccentric to the right of the inner wheel 18 and adjacent the center thereof and is then located in that position.

In this manner, the toothed belt 15 may be rotatably driven without being bent even if it is subjected to tensile force due to the eccentric movement of the driving gear 14. For this reason, the toothed belt is not damaged even if it is used over a long period of time.

The inner gear means 14B of small diameter is eccentric in relation to and is rotated by the crank gear 10 to thus increase the rotational speed of the outer gear means 14A. As a result, the driven pulley may be rotated at a predetermined speed without requiring the outer diameter and dimension of the outer gear means 14A to be increased so much. This minimizes the weight of the driving gear 14 as a whole and renders the instant apparatus lightweight. In addition, not only may the toothed belt 15 be reduced in length and dimension but there is also a small difference in the outer diameter and dimension of the crank gear 10 and the inner gear means 14B, thereby avoiding generation of noise.

The extent of eccentricity of the inner gear means 14B relative to the crank gear 10 is limited to a given value by the control plate 21 so that the teeth 14b of the inner gear means 14B positively mesh with the teeth of the crank gear 10 and are thus eccentric to the position shown in FIG. 5C. The teeth 10a of the crank gear 10 are, therefore, prevented from being disengaged from the teeth 14b of the inner gear means and thus no damage to these teeth 10a, 14a occurs. The area in which the inner gear means 14a covers a range of about 180° (see the angle X) is large, as shown in FIG. 5C. This allows the pedals to be worked smoothly and tensile force to be exerted on the toothed belt 15 to thus remarkably minimize expansion and damage thereof. The inner gear means 14B (driving gear 14) is eccentrically moved to the maximum extent 1. Thus great accuracy is not required in setting the length and dimension of the toothed belt, and the operations required for training the toothed belt over the driving gear and the like are thus facilitated. Further, the toothed belt 15 may be rotatably driven even if it becomes stretched due to long use since the driving gear 14 is moved to a greater extent to accommodate such stretching.

In the aforementioned embodiment, the inner wheel 18 may be secured to the crank shaft 12 so long as it is disposed coaxially with the crank gear.

It is enough to dispose the outer wheel 16 in the inside of the outer gear means 14 coaxially therewith. For instance, the outer wheel may be fixed to the cover member 16A or 16B so long as the arrangement is such that eccentricity of the driving gear is controlled by the control plate 21.

EFFECT OF THE INVENTION

According to the first invention, the driving gear is composed of the outer gear means over which the toothed belt is trained, and the inner gear means which meshes with the teeth formed in the inner periphery of the crank gear attached to the crank shaft so that not only may the toothed belt be rotatably driven without being bent but also the rear wheel may be rotated while assuring its rotational speed without any need to increase the dimension of the driving gear, thereby avoiding generation of noise.

Consequently a belt driving apparatus is provided which is capable of using a toothed belt for a long period of time and of reducing the weight of the bicycle and the noise produced thereby.

According to the second invention, the driving gear is composed of the outer gear means over which the toothed belt is trained, and the inner gear means which meshes with the tooth formed in the inner periphery of the crank gear attached to the crank shaft, and the eccentricity control plate is interposed between the inner wheel which is rotatable coaxially and integrally with the crank gear and the outer wheel mounted in the inner gear means such as to limit the extend of eccentricity of the driving gear to a predetermined value so that not only may toothed belt be rotatably driven without being bent but also the rear wheel may be rotated while assuring its rotational speed without any need to increase the dimension of the driving gear, thereby avoiding generation of noise. Not only is the driving gear made eccentric and moved while ensuring engagement of the crank gear with the inner gear means, but also the area in which the inner gear means is eccentric and the extent of movement of the driving gear is large so that the pedals may be worked smoothly to thus remarkably minimize stretching of the toothed belt and damage thereof. Thus, great accuracy is not required in setting the length and dimension of the toothed belt. Further, the operations required for training the toothed belt over the driving gear, are facilitated, and the toothed belt may be rotatably driven even if it is stretched and used over a long period of time. Consequently, a belt driving apparatus is provided which is capable of rendering the bicycle light easily assembled.

What is claimed is:

1. A belt driving apparatus for a bicycle, comprising a driving gear having an outer gear means over which is trained a toothed belt to impart a rotational force to a side of a rear wheel and an inner gear means disposed in the interior of said outer gear means to be substantially coaxial therewith and including teeth formed in the outer periphery of said inner gear means; and a crank gear mounted on a crank shaft and having teeth on its inner periphery, said crank gear being disposed between said outer and inner gear means to mesh with said inner gear means.

2. A belt driving apparatus for a bicycle, comprising a driving gear having an outer gear means over which is trained a toothed belt to impart a rotational force to a side of a rear wheel and an inner gear means disposed in the interior of said outer gear means to be coaxial therewith and including teeth formed in the outer periphery of said inner gear means; a crank gear mounted on a crank shaft and having teeth on its inner periphery, said crank gear being disposed between said outer and inner gear means to mesh with said inner gear means; an inner wheel arranged in said crank gear to be coaxial therewith; an outer wheel disposed axially of said driving gear; and a control plate rotatably arranged between said outer and inner wheels to be eccentric to said inner wheel by a predetermined extent to control the extent of eccentricity of said driving gear.

* * * * *